United States Patent
Chang et al.

(10) Patent No.: US 12,112,433 B2
(45) Date of Patent: Oct. 8, 2024

(54) APPARATUS AND METHODS FOR IMAGE RECONSTRUCTION USING MACHINE LEARNING PROCESSES

(71) Applicant: QUALCOMM INCORPORATED, San Diego, CA (US)

(72) Inventors: Wei-Lun Chang, Hsinchu (TW); Michel Adib Sarkis, San Diego, CA (US); Chieh-Ming Kuo, Taoyuan (TW); Kuang-Man Huang, Zhubei (TW)

(73) Assignee: QUALCOMM Incorporated, San Diego, CA (US)

( * ) Notice: Subject to any disclaimer, the term of this patent is extended or adjusted under 35 U.S.C. 154(b) by 141 days.

(21) Appl. No.: 17/714,743

(22) Filed: Apr. 6, 2022

(65) Prior Publication Data

US 2023/0326136 A1 Oct. 12, 2023

(51) Int. Cl.
  *G06T 17/20* (2006.01)
  *G06N 3/045* (2023.01)
  *G06V 10/22* (2022.01)

(52) U.S. Cl.
  CPC ............ *G06T 17/20* (2013.01); *G06N 3/045* (2023.01); *G06V 10/235* (2022.01)

(58) Field of Classification Search
  CPC ......... G06T 17/20; G06T 17/00; G06N 3/045; G06V 10/235
  See application file for complete search history.

(56) References Cited

U.S. PATENT DOCUMENTS

| | | | |
|---|---|---|---|
| 8,737,683 B2* | 5/2014 | Kirmse | G06F 16/29 345/419 |
| 10,529,137 B1* | 1/2020 | Black | G06T 15/04 |
| 10,607,135 B2* | 3/2020 | Zhang | G06N 3/045 |
| 10,679,046 B1* | 6/2020 | Black | G06V 40/23 |
| 11,006,038 B2* | 5/2021 | Mandavilli | G06V 40/1365 |
| 11,055,514 B1* | 7/2021 | Cao | G06V 40/161 |
| 11,403,800 B1* | 8/2022 | Prokudin | G06V 10/82 |

(Continued)

OTHER PUBLICATIONS

Chaudhuri B., "Personalized Face Modeling for Improved Face Reconstruction and Motion Retargeting," ECCV, arXiv:2007.06759v2 [cs.CV], Jul. 17, 2020, pp. 1-20.

(Continued)

*Primary Examiner* — Motilewa Good-Johnson
(74) *Attorney, Agent, or Firm* — QUALCOMM Incorporated

(57) ABSTRACT

Methods, systems, and apparatuses are provided to automatically reconstruct an image, such as a 3D image. For example, a computing device may obtain an image, and may apply a first trained machine learning process to the image to generate coefficient values characterizing the image in a plurality of dimensions. Further, the computing device may generate a mesh based on the coefficient values. The computing device may apply a second trained machine learning process to the coefficient values and the image to generate a displacement map. Based on the mesh and the displacement map, the computing device may generate output data characterizing an aligned mesh. The computing device may store the output data within a data repository. In some examples, the computing device provides the output data for display.

20 Claims, 6 Drawing Sheets

(56) References Cited

U.S. PATENT DOCUMENTS

| | | | |
|---|---|---|---|
| 11,776,210 B2* | 10/2023 | Takeda | G06N 3/08 345/419 |
| 11,869,150 B1* | 1/2024 | Mason | G06N 3/0464 |
| 2017/0051057 A1* | 2/2017 | Pullen | A61P 13/10 |
| 2019/0051057 A1* | 2/2019 | Sommerlade | G06T 19/20 |
| 2019/0122074 A1* | 4/2019 | Zhang | G06N 3/045 |
| 2021/0390767 A1* | 12/2021 | Johnson | G06V 40/176 |
| 2022/0051094 A1* | 2/2022 | Chentanez | G06N 3/04 |
| 2022/0288783 A1* | 9/2022 | Sundermeyer | G06T 7/55 |
| 2022/0318591 A1* | 10/2022 | Haderbache | G06F 30/23 |
| 2022/0414985 A1* | 12/2022 | Ge | G06V 40/107 |
| 2023/0019874 A1* | 1/2023 | Cordani | G06N 3/08 |
| 2023/0077187 A1* | 3/2023 | Zafeiriou | G06T 3/4053 |
| 2023/0094954 A1* | 3/2023 | Sinha | G06V 10/774 382/103 |
| 2023/0124252 A1* | 4/2023 | Liu | G06T 11/001 345/589 |
| 2023/0137403 A1* | 5/2023 | Gallo | G06V 40/20 348/47 |
| 2023/0332111 A1* | 10/2023 | Wagner | C12M 27/02 435/366 |

OTHER PUBLICATIONS

Feng Y., et al., "Joint 3D Face Reconstruction and Dense Alignment with Position Map Regression Network", arxiv.org, Cornell University Library, 201 Olin Library Cornell University Ithaca, NY 14853, Mar. 21, 2018 (Mar. 21, 2018), XP080861522, 18 Pages, Cited in the application the whole document.

Kato H., et al., "Neural 3D Mesh Renderer," CVPR, 2018, arXiv:1711.07566v1 [cs.CV], Nov. 20, 2017, 17 pages.

Liu S., et al., "Soft Rasterizer: A Differentiable Renderer for Image-based 3D Reasoning," ICCV, arXiv:1904.01786v1 [cs.CV], Apr. 3, 2019, pp. 1-15.

Sanyal S., et al., "Learning to Regress 3D Face Shape and Expression from an Image without 3D Supervision," CVPR, arXiv:1905.06817v1 [cs.CV], May 16, 2019, pp. 1-10.

Tewari A., et al., "FML: Face Model Learning from Videos," CVPR, 2019, pp. 10812-10822.

Tran L., et al., "Nonlinear 3D Face Morphable Model," CVPR, arXiv:1804.03786v3 [cs.CV], Aug. 26, 2018, 10 pages.

Zhang Z., "Learning to Aggregate and Personalize 3D Face from In-the-Wild Photo Collection," CVPR, 2021, arXiv:2106.07852v1 [cs.CV], Jun. 15, 2021, pp. 1-11.

Zhu W., et al., "ReDA:Reinforced Differentiable Attribute for 3D Face Reconstruction," CVPR, 2020, pp. 4958-4967.

* cited by examiner

APPARATUS AND METHODS FOR IMAGE RECONSTRUCTION USING MACHINE LEARNING PROCESSES

BACKGROUND

Field of the Disclosure

This disclosure relates generally to image reconstruction and, more specifically, to reconstructing images using machine learning processes.

Description of Related Art

Image capture devices, such as phones, tablets, personal computers, and smart devices, may capture images such as "selfies," for example. The image capture devices may include image reconstruction technology to reconstruct a three-dimensional (3D) image from a captured image. For instance, the image capture devices may support 3D Morphable Models (3DMM) to reconstruct a 3D image from a red, green, blue (RGB) image. The reconstructed images may be utilized in a variety of applications, such as in gaming, computer vision, augmented reality (AR), virtual reality (VR), medical, and robotics applications, among others.

SUMMARY

According to one aspect, a method includes obtaining an image. The method also includes applying a first trained machine learning process to the image to generate coefficient data characterizing the image in a plurality of dimensions. Further, the method includes generating first mesh data characterizing a first mesh of the image based on the coefficient data. The method also includes applying a second trained machine learning process to the coefficient data and the image to generate displacement data characterizing a displacement image. The method further includes generating second mesh data characterizing a second mesh of the image based on the first mesh data and the displacement data.

According to another aspect, an apparatus comprises a non-transitory, machine-readable storage medium storing instructions, and at least one processor coupled to the non-transitory, machine-readable storage medium. The at least one processor is configured to obtain an image. The at least one processor is also configured to apply a first trained machine learning process to the image to generate coefficient data characterizing the image in a plurality of dimensions. Further, the at least one processor is configured to generate first mesh data characterizing a first mesh of the image based on the coefficient data. The at least one processor is also configured to apply a second trained machine learning process to the coefficient data and the image to generate displacement data characterizing a displacement image. The at least one processor is further configured to generate second mesh data characterizing a second mesh of the image based on the first mesh data and the displacement data.

According to another aspect, a non-transitory, machine-readable storage medium stores instructions that, when executed by at least one processor, causes the at least one processor to perform operations that include obtaining an image. The operations also include applying a first trained machine learning process to the image to generate coefficient data characterizing the image in a plurality of dimensions. Further, the operations include generating first mesh data characterizing a first mesh of the image based on the coefficient data. The operations also include applying a second trained machine learning process to the coefficient data and the image to generate displacement data characterizing a displacement image. The operations further include generating second mesh data characterizing a second mesh of the image based on the first mesh data and the displacement data.

According to another aspect, an image capture device includes a means for obtaining an image, a means for applying a first trained machine learning process to the image to generate coefficient data characterizing the image in a plurality of dimensions, and a means for generating first mesh data characterizing a first mesh of the image based on the coefficient data. The image capture device also includes a means for applying a second trained machine learning process to the coefficient data and the image to generate displacement data characterizing a displacement image, and a means for second mesh data characterizing a second mesh of the image based on the first mesh data and the displacement data.

DETAILED DESCRIPTION

Figure 1:
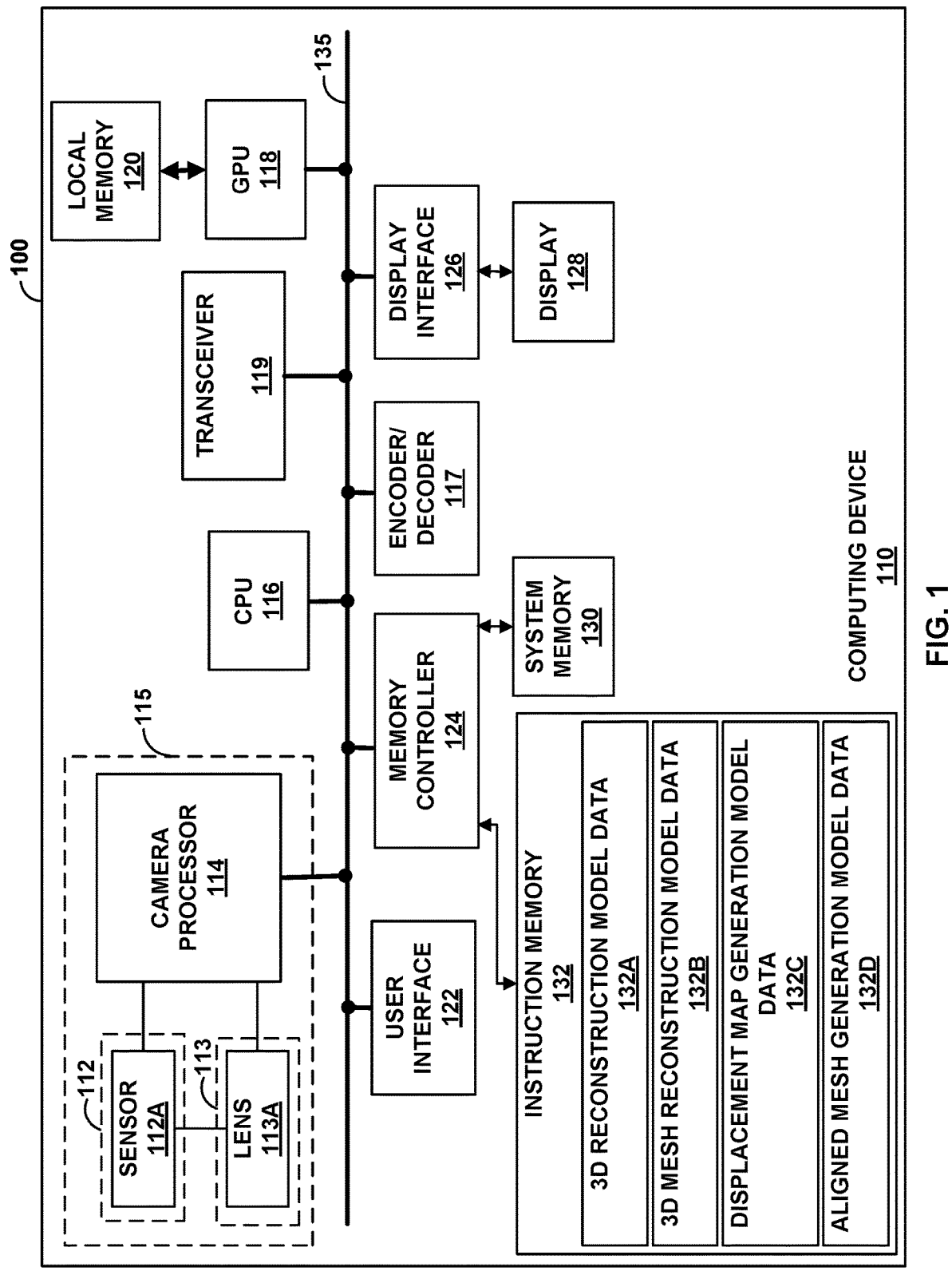
FIG. 1 is a block diagram of an exemplary image reconstruction device, according to some implementations.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

Various systems, such as gaming, computer vision, augmented reality (AR), virtual reality (VR), medical, and robotics applications rely on image reconstruction technology to, for example, generate three-dimensional (3D) images for use within the applications. For example, imaging devices, such as digital cameras, smartphones, tablet computers, laptop computers, automobiles, or Internet-of-things (IoT) devices (e.g., security cameras, etc.), may capture a person's image, and may reconstruct a 3D image based on the person's image. For instance, the imaging devices, may capture an image of a user's face, such as a gamer's face, and may reconstruct a 3D image of the user's face for use within a virtual reality (VR) or augmented reality (AR) based game, e.g., as part of an avatar.

The use of existing image reconstruction technologies, such as 3D Morphable Models (3DMM), however, struggle to accurately reconstruct images when the reconstructed image is to include an object, such as a person's face, that can have wide variation. For example, facial images can have many variations in anatomical structures, such as variations in nose, lip, or eye shapes. Conventional image reconstruction technologies may not accurately reproduce these and other portions of an imaged face due to these and other facial variations. As such, many image reconstruction applications, such as 3D facial reconstruction applications, can benefit from image reconstruction processes that can more accurately reconstruct images that include objects of high variation.

In some implementations, an image capture device may include one or more optical elements, such as an assembly of one or more lenses (e.g., a lens assembly), that focus incident light onto an imaging sensor disposed at a corresponding imaging plane (e.g., an array of sensing elements formed within a semiconductor substrate). The lens assemblies may also include a shutter that, when open, allows the incident light to reach sensing elements of the imaging sensor. Each of the sensing elements may collect incident light and generate an electrical signal, which characterizes and measures a value of a luminance of the incident light and, further, a chrominance of the incident light. For example, each of the sensing elements may include color-filtered photodiodes, e.g., to establish red, green, and blue (RGB) color channels. The imaging sensor may use various capture modes under various circumstances to capture frames of image data, such as video data or still images (e.g., snapshots).

Further, the image capture device may include one or more processors that execute one or more trained machine learning processes, such as the trained 3D fitting model and the trained convolutional neural network (CNN) described herein, to reconstruct an image with a plurality of dimensions, such as a 3D image. The one or more processors may include, for example, a camera processor, a central processing unit (CPU), a graphical processing unit (GPU), a digital signal processor (DSP), or a neural processing unit (NPU). Based on the execution of instructions stored in non-volatile memory, the one or more processors may apply the trained 3D fitting model to a captured image to generate and output coefficient data that characterizes the captured image in a plurality of dimensions. The coefficient data may include, for example, values that characterize, for each of a plurality of color channels (e.g., red, green, and blue channels), one or more of image pixel values, a plurality of vertices, texture values and coordinates (e.g., UV texture values and UV texture coordinates), object rotation angles (e.g., pitch, yaw, and roll), and focal lengths. The one or more processor may execute the trained 3D fitting model to, for example, ingest elements of a captured image, and generate elements of output coefficient data comprising the values.

Further, and based on the coefficient data, the one or more processors may generate first mesh data characterizing a first mesh of the image. For instance, the one or more processors may generate the first mesh data based on a plurality of texture coordinates and texture values defined within the coefficient data. Further, the one or more processors may apply the trained CNN to the coefficient data and the captured image, and based on the application of the trained CNN to the coefficient data and the captured image, the one or more processors may generate a displacement map (e.g., residual map). The displacement map may, for example, include a displacement value for each of a plurality of vertices of the captured image. For instance, the one or more processors may perform operations that establish nodes of the trained CNN, which ingest corresponding elements of the coefficient data and the captured image, and output elements of displacement data that include the displacement values.

Based on the first mesh data and the displacement map, the one or more processors may generate second mesh data characterizing a second mesh of the image. For instance, the one or more processors may sample the displacement map to obtain displacement values, and may add the displacement values to corresponding mesh values defined by the first mesh data to generate the second mesh data.

As described herein, the CNN may be trained against images and corresponding coefficient data, such as UV texture values and corresponding UV texture coordinates. For example, the one or more processors may execute the untrained CNN to ingest the images (e.g., ground truth image data), along with corresponding coefficient data, for training. Further, and during training, the one or more processors may determine one or more losses based on the output displacement data generated from the CNN. For instance, the one or more processors may generate the second mesh data based on the output displacement data and the first mesh data, and may determine a first loss between the first mesh data and the second mesh data. The first loss may represent a fidelity loss that characterizes errors between the first mesh data and the second mesh data. For instance, the fidelity loss may be an error between the first mesh and the second mesh on the "z" component in 3D space (e.g., x, y, z space).

Further, the one or more processors may apply a differential rendering process to the second mesh data to generate predicted mask data, and determine a second loss, such as an F1 loss or F2 loss, between the predicted mask data and ground truth mask data. Further, the one or more processors may generate vertex projection data based on the second mesh data. For instance, the second mesh (e.g., the aligned mesh), may be generated in canonical space. Prior to generating the vertex projection data, the one or more processors may rotate and translate the second mesh into camera space. Once in camera space, the one or more processors may generate the vertex projection data based on the second mesh in camera space (e.g., based on based on a full perspective, according a viewport (e.g., image size), and focal length of the image, and the second mesh in camera-space.

Further, and based on the vertex projection data and the ground truth mask data, the one or more processors may determine a third loss, and a fourth loss. The third loss may represent a contour loss characterizing errors between vertices of the second mesh data and the vertex projection data in a first direction, and the fourth loss may be a contour normal loss characterizing errors between vertices of the second mesh data and the vertex projection data in a second direction. The second direction may be normal to the first direction.

In other examples, the one or more processors may apply an initially trained CNN to a validation set (e.g., a validation set of images and corresponding coefficient data, which may be distinct form the those images and coefficient data associated with the exemplary training processes described herein), and may determine whether the initially trained CNN is sufficiently trained based on the output displacement data generated during the validation. For example, the one or more processors may compute one or more losses, as described herein, based on the output displacement data generated by the executed CNN during the validation. If the computed losses indicate that the CNN is not sufficiently trained (e.g., the one or more computed losses do not meet corresponding thresholds, etc.), the one or more processors continue training the CNN (e.g., with additional training images and corresponding coefficient data).

When training is complete, the one or more processors store values for configuration parameters, hyperparameters, and/or weights associated with the trained CNN in a data repository. The stored values for the configuration parameters, hyperparameters, and/or weights allow the one or more processors to configure the CNN (e.g., the trained CNN) for use during inference. For example, the one or more processors may obtain the configuration parameters, hyperparameters, and/or weights from the data repository, and may configure the CNN with the obtained configuration parameters, hyperparameters, and/or weights for (e.g., real-time) execution during inference.

Among other advantages, the embodiments described herein may provide more accurate image reconstruction capabilities, such as the reconstruction of 3D images that include objects with variation, such as captured facial images (e.g., 3D face reconstruction). For instance, the embodiments may more accurately reconstruct 3D facial images even though there is large structural variation across persons' faces. Further, the embodiments may be employed across a variety of applications, such as in gaming, computer vision, AR, VR, medical, biometric, facial recognition, and robotics applications, among others. Persons of ordinary skill in the art having the benefit of these disclosures would recognize these and other benefits as well.

FIG. 1 is a block diagram of an exemplary image capture device 100. The functions of image capture device 100 may be implemented in one or more processors, one or more field-programmable gate arrays (FPGAs), one or more application-specific integrated circuits (ASICs), one or more state machines, digital circuitry, any other suitable circuitry, or any suitable hardware. Image capture device 100 may perform one or more of the exemplary functions and processes described in this disclosure. Examples of image capture device 100 include, but are not limited to, a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), an Internet telephone, a digital camera, a digital video recorder, a handheld device, such as a portable video game device or a personal digital assistant (PDA), a drone device, a virtual reality device (e.g., a virtual reality headset), an augmented reality device (e.g., augmented reality glasses), a virtual reality device (e.g., virtual reality headset), or any device that may include one or more cameras.

As illustrated in the example of FIG. 1, image capture device 100 may include one or more image sensors 112, such as image sensor 112A, one or more lenses 113, such as lens 113A, and one or more camera processors, such as camera processor 114. In some instances, camera processor 114 may be an image signal processor (ISP) that employs various image processing algorithms to process image data (e.g., as captured by corresponding ones of these lenses and sensors). For example, camera processor 114 may include an image front end (IFE) and/or an image processing engine (IPE) as part of a processing pipeline. Further, a camera 115 may refer to a collective device including one or more image sensors 112, one or more lenses 113, and one or more camera processors 114.

Image capture device 100 may further include a central processing unit (CPU) 116, an encoder/decoder 117, a graphics processing unit (GPU) 118, a local memory 120 of GPU 118, a user interface 122, a memory controller 124 that provides access to system memory 130 and to instruction memory 132, and a display interface 126 that outputs signals that causes graphical data to be displayed on display 128.

In some examples, one of image sensors 112 may be allocated for each of lenses 113. Further, in some examples, one or more of image sensors 112 may be allocated to a corresponding one of lenses 113 of a respective, and different, lens type (e.g., a wide lens, ultra-wide lens, telephoto lens, and/or periscope lens, etc.). For instance, lenses 113 may include a wide lens, and a corresponding one of image sensors 112 having a first size (e.g., 108 MP) may be allocated to the wide lens. In other instance, lenses 113 may include an ultra-wide lens, and a corresponding one of image sensors 112 having a second, and different, size (e.g., 16 MP) may be allocated to the ultra-wide lens. In another instance, lenses 113 may include a telephoto lens, and a corresponding one of image sensors 112 having a third size (e.g., 12 MP) may be allocated to the telephoto lens.

In an illustrative example, a single image capture device 100 may include two or more cameras (e.g., two or more of camera 115), and at least two of the cameras include image sensors (e.g., image sensors 112) having a same size (e.g., two 12 MP sensors, three 108 MP sensors, three 12 MP sensors, two 12 MP sensors and a 108 MP sensor, etc.). Further, in some examples, a single image sensor, e.g., image sensor 112A, may be allocated to multiple ones of lenses 113. Additionally, or alternatively, each of image sensors 112 may be allocated to a different one of lenses 113, e.g., to provide multiple cameras to image capture device 100.

In some examples, not illustrated in FIG. 1, image capture device 100 may include multiple cameras (e.g., a mobile phone having one or more front-facing cameras and one or more rear-facing cameras). For instance, image capture device 100 may include a first camera, such as camera 115 that includes a 16 MP image sensor, a second camera that includes a 108 MP image sensor, and a third camera that includes a 12 MP image sensor.

In some examples, image capture device 100 may include multiple cameras facing in different directions. For example, image capture device 100 may include dual "front-facing" cameras. Additionally, in some examples, image capture device 100 may include a "front-facing" camera, such as camera 115, and a "rear-facing" camera. In other examples, image capture device 100 may include dual "front-facing" cameras, which may include camera 115, and a "rear-facing" camera. In further examples, image capture device 100 may include three "front-facing" cameras, such as camera 115. In yet other examples, image capture device 100 may include three "front-facing" cameras, and one, two, or three "rear-facing" cameras. Further, a person of skill in the art would appreciate that the techniques of this disclosure may be implemented for any type of camera and for any number of cameras of image capture device 100.

Each of the image sensors 112, including image sensor 112A, may represent an image sensor that includes processing circuitry, an array of pixel sensors (e.g., pixels) for capturing representations of light, memory, an adjustable lens (such as lens 113), and an actuator to adjust the lens. By way of example, image sensor 112A may be associated with, and may capture images through, a corresponding one of lenses 113, such as lens 113A. In other examples, additional, or alternate, ones of image sensors 112 may be associated with, and capture images through, corresponding additional ones of lenses 113.

In some instances, image sensors 112 may include a monochrome sensor (e.g., a "clear" pixel sensor) and/or a color sensor (e.g., a Bayer sensor). For example, a monochrome pixel sensor may be established through a disposition of a monochrome filter over image sensor 112A. Further, in some examples, a color pixel sensor may be established through a disposition of a color filter, such as a Bayer filter, disposed over image sensor 112A, or through a disposition of a red filter, a green filter, or a blue filter may over image sensor 112A. Various other filter patterns exist, such as red, green, blue, white ("RGBW") filter arrays; cyan, magenta, yellow, white (CMYW) filter arrays; and/or variations thereof, including proprietary or non-proprietary filter patterns. Although this disclosure discusses certain examples in terms of particular filter patterns, other filter patterns may be used in accordance with the techniques of this disclosure.

Image sensors 112 may also include a subset of two or more different image sensors operating in conjunction with one another. For example, image sensors 112 may include two different "color" pixel sensors operating in conjunction with one another. The different color pixel sensors may support different binning types and/or binning levels, and although operating in conjunction with one another, the different color pixel sensors may each operate with respect to a particular range of zoom levels. Further, within each zoom level range, each of the different color pixel sensors may transition between various binning levels (e.g., transition from binning to non-binning modes). For example, camera processor 114 may cause two or more of image sensors 112 operating in conjunction with one another (e.g., the different color pixel sensors described herein) to each transition between various binning levels independently and in accordance with a respective binning transition thresholds, e.g., as stored in system memory 130.

Further, in some examples, multiple ones of lenses 113 may be associated with, and disposed over, respective subsets of image sensors 112. For instance, a first subset of sensors 112 may be allocated to a first one of lenses 113 (e.g., a wide lens camera, ultra-wide lens camera, telephoto lens camera, periscope lens camera, etc.), and a second subset of image sensors 112 may be allocated to a second one of lenses 113 distinct from the first subset. In some instances, each of lenses 113 may serve respective functions as provided by various attributes of the cameras (e.g., lens attributes, aperture attributes, angle-of-view attributes, thermal imaging attributes, etc.), and a user of image capture device 100 may leverage the various attributes of each of lenses 113 to capture one or more images or sequences of images (e.g., as in a video recording).

Additionally, in some instances, image capture device 100 may receive user input via user interface 132, and response to the received user input, CPU 116 and/or camera processor 114 may activate respective ones of lenses 113, or combinations of lenses 113. For example, the received user input may corresponding a user selection of lens 113A (e.g., a fisheye lens), and based on the received user input, CPU 116 may select an initial one of lenses 113 to activate and additionally, or alternatively, may transition from the initially selected lens to another one of lenses 113.

In other examples, CPU 116 and/or camera processor 114 may detect an operating condition that satisfies certain lens-selection criteria (e.g., digital zoom level satisfying a predefined camera transition threshold, a change in lighting conditions, input from a user calling for a particular lens 13, etc.), and may select the initial one of lenses 113, such as lens 113A, for activation based on the detected operating condition. In some examples, image capture device 100 may include multiple ones of camera 115, which may collectively capture one synthetic image or stream of synthetic images, such that camera processor 114 or CPU 116 may process one synthetic image or stream of synthetic images based on image data captured from sensors 112.

In some examples, each of lenses 113 and image sensors 112 may operate collectively to provide various optical zoom levels, angles of view (AOV), focal lengths, and FOVs. Further, light guides may be used to direct incident light from lenses 113 to a respective one of sensors 112, and examples of the light guides may include, but are not limited to, a prism, a moving prism, or one or more mirrors. For instance, light received from lens 113A may be redirected from image sensor 112A toward another one of image sensors 112. Further, in some instances, camera processor 114 may perform operations that cause a prism to move and redirect light incident lens 113A in order to effectively change the focal length for the received light.

Further, as illustrated in FIG. 1, a single camera processor, such as camera processor 114, may be allocated to and interface with all, or a selected subset, of image sensors 112. In other instances, multiple camera processors may be allocated to and interface with all, or a selected subset, of image sensors 112, and each of the camera processors may coordinate with one another to efficiently allocate processing resources to the all, or the selected subset, of image sensors 112. For example, and through the execution of stored instructions, camera processor 114 may implement multiple processing algorithms under various circumstances to perform digital zoom operations or other image processing operations.

Although the various components of image capture device 100 are illustrated as separate components, in some examples, the components may be combined to form a system on chip (SoC). As an example, camera processor 114, CPU 116, GPU 118, and display interface 126 may be implemented on a common integrated circuit (IC) chip. In some examples, one or more of camera processor 114, CPU 116, GPU 118, and display interface 126 may be implemented in separate IC chips. Various other permutations and combinations are possible, and the techniques of this disclosure should not be considered limited to the example of FIG. 1.

System memory 130 may store program modules and/or instructions and/or data that are accessible by camera processor 114, CPU 116, and GPU 118. For example, system memory 130 may store user applications (e.g., instructions for the camera application) and resulting images from camera processor 114. System memory 130 may additionally store information for use by and/or generated by other components of image capture device 100. For example, system memory 130 may act as a device memory for camera processor 114. System memory 130 may include one or more volatile or non-volatile memories or storage devices, such as, for example, random access memory (RAM), static RAM (SRAM), dynamic RAM (DRAM), read-only memory (ROM), erasable programmable ROM (EPROM), electrically erasable programmable ROM (EEPROM), flash memory, a magnetic data media, cloud-based storage medium, or an optical storage media.

Camera processor 114 may store data to, and read data from, system memory 130. For example, camera processor 114 may store a working set of instructions to system memory 130, such as instructions loaded from instruction memory 132. Camera processor 114 may also use system memory 130 to store dynamic data created during the operation of image capture device 100.

Similarly, GPU 118 may store data to, and read data from, local memory 120. For example, GPU 118 may store a working set of instructions to local memory 120, such as instructions loaded from instruction memory 132. GPU 118 may also use local memory 120 to store dynamic data created during the operation of image capture device 100. Examples of local memory 120 include one or more volatile or non-volatile memories or storage devices, such as RAM, SRAM, DRAM, EPROM, EEPROM, flash memory, a magnetic data media, a cloud-based storage medium, or an optical storage media.

Instruction memory 132 may store instructions that may be accessed (e.g., read) and executed by one or more of camera processor 114, CPU 116, and GPU 118. For example, instruction memory 132 may store instructions that, when executed by one or more of camera processor 114, CPU 116, and GPU 118, cause one or more of camera processor 114, CPU 116, and GPU 118 to perform one or more of the operations described herein. For instance, instruction memory 132 can include 3D fitting model data 132A that can include instructions that, when executed by one or more of camera processor 114, CPU 116, and GPU 118, cause camera processor 114, CPU 116, and GPU 118 to execute a corresponding 3D fitting model, such as the 3D fitting model described herein. Instruction memory 132 can also include 3D mesh reconstruction model data 132B that can include instructions that, when executed by one or more of camera processor 114, CPU 116, and GPU 118, cause camera processor 114, CPU 116, and GPU 118 to reconstruct a mesh as described herein. Further, instruction memory 132 can also include displacement map generation model data 132C that can include instructions that, when executed by one or more of camera processor 114, CPU 116, and GPU 118, cause camera processor 114, CPU 116, and GPU 118 to execute a corresponding map generation model, such as the CNN described herein. Instruction memory 132 can also include aligned mesh generation model data 132D that can include instructions that, when executed by one or more of camera processor 114, CPU 116, and GPU 118, cause camera processor 114, CPU 116, and GPU 118 to generate an aligned mesh as described herein.

Each of 3D fitting model data 132A, 3D mesh reconstruction model data 132B, displacement map generation model data 132C, and aligned mesh generation model data 132D may further include, in some examples, one or more corresponding configuration parameters, hyperparameters, and weights. Instruction memory 132 may also store instructions that, when executed by one or more of camera processor 114, CPU 116, and GPU 118, cause one or more of camera processor 114, CPU 116, and GPU 118 to perform image processing operations, such as one or more of automatic focus (AF), automatic exposure (AE), automatic gain (AG), or automatic white balance (AWB). Instruction memory 130 may include read-only memory (ROM) such as EEPROM, flash memory, a removable disk, CD-ROM, any non-volatile memory, any non-volatile memory, or any other suitable memory.

The various components of image capture device 100, as illustrated in FIG. 1, may be configured to communicate with each other across bus 135. Bus 135 may include any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus), or another type of bus or device interconnect. It is to be appreciated that the specific configuration of components and communication interfaces between the different components shown in FIG. 1 is merely exemplary, and other configurations of the components, and/or other image processing systems with the same or different components, may be configured to implement the operations and processes of this disclosure.

Camera processor 114 may be configured to receive image frames (e.g., pixel data, image data) from image sensors 112, and process the image frames to generate image and/or video content. For example, image sensor 112A may be configured to capture individual frames, frame bursts, frame sequences for generating video content, photo stills captured while recording video, image previews, or motion photos from before and/or after capture of a still photograph. CPU 116, GPU 118, camera processor 114, or some other circuitry may be configured to process the image and/or video content captured by image sensor 112A into images or video for display on display 128. In an illustrative example, CPU 116 may cause image sensor 112A to capture image frames, and may receive pixel data from image sensor 112A. In the context of this disclosure, image frames may generally refer to frames of data for a still image or frames of video data or combinations thereof, such as with motion photos. Camera processor 114 may receive, from image sensors 112, pixel data of the image frames in any suitable format. For instance, the pixel data may be formatted according to a color format such as RGB, YCbCr, or YUV.

In some examples, camera processor 114 may include an image signal processor (ISP). For instance, camera processor 114 may include an ISP that receives signals from image sensors 112, converts the received signals to image pixels, and provides the pixel values to camera processor 114. Additionally, camera processor 114 may be configured to perform various operations on image data captured by image sensors 112, including auto gain, auto white balance, color correction, or any other image processing operations.

Memory controller 124 may be communicatively coupled to system memory 130 and to instruction memory 132. Memory controller 124 may facilitate the transfer of data going into and out of system memory 130 and/or instruction memory 132. For example, memory controller 124 may receive memory read and write commands, such as from camera processor 114, CPU 116, or GPU 118, and service such commands to provide memory services to system memory 130 and/or instruction memory 132. Although memory controller 124 is illustrated in the example of FIG. 1 as being separate from both CPU 116 and system memory 130, in other examples, some or all of the functionality of memory controller 124 with respect to servicing system memory 130 may be implemented on one or both of CPU 116 and system memory 130. Likewise, some or all of the functionality of memory controller 124 with respect to servicing instruction memory 132 may be implemented on one or both of CPU 116 and instruction memory 132.

Camera processor 114 may also be configured, by executed instructions, to analyze image pixel data and store resulting images (e.g., pixel values for each of the image pixels) to system memory 130 via memory controller 124. Each of the images may be further processed for generating a final image for display. For example, GPU 118 or some other processing unit, including camera processor 114 itself, may perform color correction, white balance, blending, compositing, rotation, digital zoom, or any other operations to generate the final image content for display.

In addition, image capture device 100 may include a video encoder and/or video decoder 117, either of which may be integrated as part of a combined video encoder/decoder (CODEC). Encoder/decoder 117 may include a video coder that encodes video captured by one or more camera(s) 115 or a decoder that decodes compressed or encoded video data.

In some instances, CPU 116 may be configured to encode and/or decode video data using encoder/decoder 117.

CPU 116 may comprise a general-purpose or a special-purpose processor that controls operation of image capture device 100. A user may provide input to image capture device 100 to cause CPU 116 to execute one or more software applications. The software applications executed by CPU 116 may include, for example, a camera application, a graphics editing application, a media player application, a video game application, a graphical user interface application or another program. For example, and upon execution by CPU 116, a camera application may allow the user to control various settings of camera 115, e.g., via input provided to image capture device 100 via user interface 122. Examples of user interface 122 include, but are not limited to, a pressure-sensitive touchscreen unit, a keyboard, a mouse, or an audio input device, such as a microphone. For example, user interface 122 may receive input from the user to adjust desired zoom levels (e.g., digital zoom levels), alter aspect ratios of image data, record video, take a snapshot while recording video, apply filters when capturing images, select a region-of-interest (ROI) (e.g., a FOZ) for AF, AE, AG, or AWB operations, record slow motion video or super slow motion video, apply night shot settings, and/or capture panoramic image data, among other examples.

By way of example, the executed camera application may cause CPU 116 to generate content that is displayed on display 128. For instance, display 128 may display information such as a preview of an image as captured by one or more of sensors 112, a configured light intensity, whether flash is enabled, and other such information. The user of image capture device 100 may interface with display 128 (e.g., via user interface 122) to configure the manner in which the images are generated (e.g., with or without flash, focus settings, exposure settings, gain settings, white balance settings, as well as other settings or parameters). The executed camera application may also cause CPU 116 to instruct camera processor 114 to process the images captured by sensor 112A in a user-defined manner. For example, CPU 116 may instruct camera processor 114 to perform a zoom operation on the images captured by one or more of sensors 112, e.g., in response to a request to zoom provided by the user via user interface 122. The request for zoom may include, but is not limited to, a pinch-to-zoom command, a discrete input, such as operation of a 0.5× zoom button, 2× zoom button, 3× zoom button, 10× zoom button, etc., a slider input, or some combination thereof.

Further, in some examples, a zoom operation may include a digital zoom defined by a zoom field (e.g., the FOZ described herein). For instance, a zoom field may include a portion of less than the full FOV of sensor 112A. CPU 116 may instruct camera processor 114 to perform the digital zoom operation based on the zoom field.

As described herein, one or more of CPU 116 and GPU 118 may perform operations that apply a trained machine learning process, such as the 3D fitting model characterized by 3D fitting model data 132A stored in instruction memory 132, to a frame of image data captured by one or more of image sensors 112. For instance, one or more of image sensors 112 may capture an image that includes a face. CPU 116 may apply the 3D fitting model to the captured image and generate coefficient data characterizing the captured image in a plurality of dimensions (e.g., three dimensions). The one or more of CPU 116 and GPU 118 may also perform operations that generate mesh data characterizing a mesh of the captured image based on the coefficient data. For example, the one or more of CPU 116 and GPU may apply the 3D mesh reconstruction model characterized by 3D mesh reconstruction model data 132B to a plurality of texture coordinates and texture values defined by the coefficient data to generate the mesh data.

Further, the one or more of CPU 116 and GPU 118 may perform operations that apply a trained machine learning process, such as a neural network characterized by displacement map generation model data 132C stored in instruction memory 132, to the coefficient data and the captured image to generate displacement map data characterizing a displacement map (e.g., a residual map, residual image). For instance, and based on applying the neural network to the coefficient data and the captured image, the neural network may ingest elements of the captured image, as well as elements of the UV texture values and UV texture coordinates of the coefficient data, to output elements of displacement map data characterizing the displacement map.

In some examples, the displacement map generation model data 132C characterizes a trained CNN that includes a plurality of convolutional layers including down sampling layers and up sampling layers, as well as corresponding joint spatial and channel attention (JSCA) layers. Each down sampling layer may be associated with a different resolution of the image data, whereas each up sampling layer may be associated with a resolution of the image data corresponding to one of the down sampling layers. The trained CNN may further include, in some examples, one or more of a flattening layer and a linear layer. The flattening layer may operate on the output data generated from the convolutional layers (e.g., the last up sampling layer) to generate a feature vector. For example, the flattening layer may convert output data from the last up sampling layer into a one-dimensional array. Further, the linear layer may operate on the feature vector generated by the flattening layer to provide a fully connected layer that generates the displacement data characterizing the displacement image.

Additionally, the one or more of CPU 116 and GPU 118 may perform operations to generate output data characterizing an aligned mesh of the image based on the mesh data and the displacement data. For example, the one or more of CPU 116 and GPU 118 may apply the aligned mesh generation model characterized by aligned mesh generation model data 132D to the mesh values of the mesh data and corresponding displacement values of the displacement data to generate the output data. For instance, when applied to the mesh values and the corresponding displacement values by CPU 116 and GPU 118, the aligned mesh generation model may combine (e.g., add) each mesh value with a displacement value corresponding to a same coordinate (e.g., pixel position) to generate an output value for that coordinate.

In some examples, applying the aligned mesh generation model includes applying a predetermined weight to one or more of each mesh value and corresponding displacement value. For instance, a first weight map may define weight values for each mesh value at each pixel position, while a second weight map may define weight values for each displacement value at each pixel position. The aligned mesh generation model may apply the first weight map to the mesh data (e.g., multiply each mesh value with its corresponding weight value), and apply the second weight map to the displacement data (e.g., multiply each displacement value with its corresponding weight value), each based on pixel position (e.g., X, Y pixel coordinate). Further, the aligned mesh generation model may combine each weighted mesh value with its corresponding weighted displacement value to generate each corresponding output value of the aligned mesh. The one or more of CPU 116 and GPU 118 may store the output data within, for example, one of system memory 130 or local memory 120.

In some examples, the one or more of CPU 116 and GPU 118 cause the output data to be displayed on display 128. In some examples, the image capture device 100 transmits, via transceiver 119, the output data to a computing device, such as a server or a user's handheld device (e.g., cellphone). For example, the image capture device 100 may transmit a message to another computing device, such as a verified user's handheld device, based on the output data. In some examples, the transmitted message causes the receiving device to display the output data characterizing the aligned mesh. For instance, the output data may characterize a mesh of a person's face, which may be displayed as the face of an avatar.

Figure 2A:
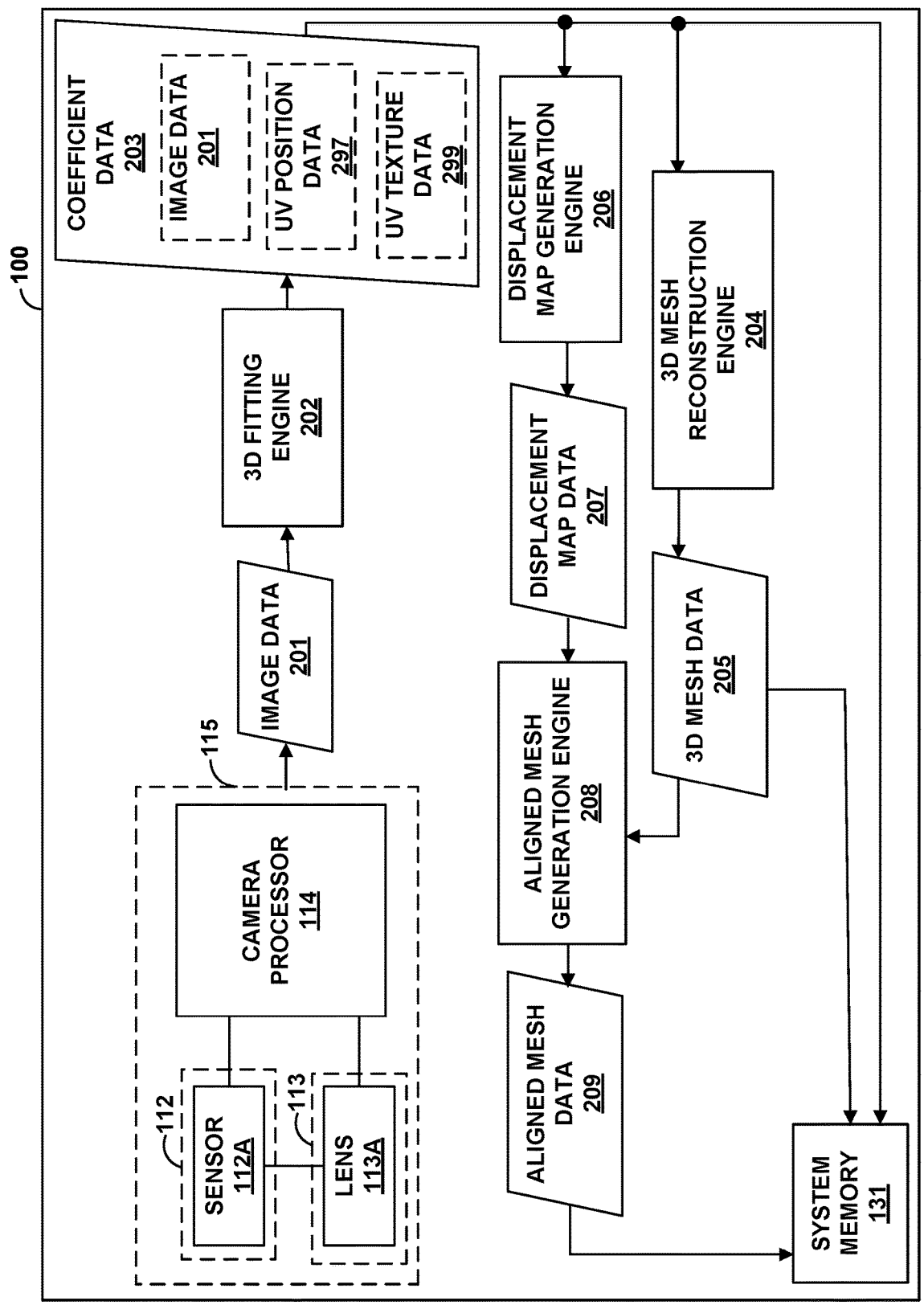
FIGS. 2A, 2B, and 3 are block diagrams illustrating portions of an exemplary image reconstruction device, according to some implementations.

FIG. 2A is a block diagram illustrating exemplary portions of the image capture device 100 of FIG. 1. In this example, image capture device 100 includes a 3D fitting engine 202, a displacement map generation engine 206, a 3D mesh reconstruction engine 204, and an aligned mesh generation engine 208. One or more of 3D fitting engine 202, displacement map generation engine 206, 3D mesh reconstruction engine 204, and aligned mesh generation engine 208 may, in some examples, be implemented in hardware. In other examples, one or more of 3D fitting engine 202, displacement map generation engine 206, 3D mesh reconstruction engine 204, and aligned mesh generation engine 208 may be implemented as executable instructions stored within instruction memory 132 that can be executed by, for example, one or more of CPU 116 and GPU 118.

As illustrated, one or more cameras 115 may capture an image (e.g., via lens 113A) and may generate image data 201 characterizing the image. In some examples, image data 201 represents one or more channels, such one or more of RGB, YCbCr, or YUV color channels. 3D fitting engine 202 may receive image data 201, and may apply a trained machine learning process, such as the 3D fitting model characterized by 3D fitting model data 132A, to the image data 201 to generate elements of coefficient data 203 that characterize the captured image. For example, 3D fitting engine 202 may obtain 3D fitting model data 132A from instruction memory 132, and may configure the trained 3D fitting model with one or more of the configuration parameters, hyperparameters, and/or weights characterized and identified by the 3D fitting model data 132A. Further, 3D fitting engine 202 may apply the trained and configured 3D fitting model to the image data 201, causing the trained and configured 3D fitting model to ingest elements of the image data 201 and generate the elements of coefficient data 203.

The coefficient data 203 may include values that characterize, for each of a plurality of color channels (e.g., red, green, and blue channels), a plurality of vertices, UV texture values and UV texture coordinates, object rotation angles, and focal lengths. For instance, as illustrated, coefficient data 203 may include image data 201, UV position data 297, and UV texture data 299. The UV position data 297 may include UV texture coordinates, while the UV texture data 299 may include corresponding UV texture values, for each pixel identified within image data 201.

In some examples, 3D fitting engine 202 determines a pose (e.g., head pose) based on a detected face, for example. Coefficient data 203 may include pose data that characterizes the pose.

Further, 3D mesh reconstruction engine 204 may receive at least portions of coefficient data 203, and may generate 3D mesh data 205 characterizing a mesh of the captured image based on the coefficient data 203. For example, 3D mesh reconstruction engine 204 may obtain 3D mesh reconstruction model data 132B from instruction memory 132, and may execute instructions associated with 3D mesh reconstruction model data 132B to apply a mesh reconstruction model to the coefficient data 203, causing the mesh reconstruction model to ingest elements of the coefficient data 203 and generate the elements of 3D mesh data 205. 3D mesh data 205 may characterize a 3D mesh of the captured image.

Displacement map generation engine 206 may receive at least portions of coefficient data 203, and may apply a trained machine learning process, such as the CNN characterized by displacement map generation model data 132C, to the portions of coefficient data 203 to generate elements of displacement map data 207 that characterize a displacement map (e.g., residual map). For example, displacement map generation engine 206 may obtain displacement map generation model data 132C from instruction memory 132, and may configure the trained CNN with one or more of the configuration parameters, hyperparameters, and/or weights characterized and identified by the displacement map generation model data 132C. Further, displacement map generation engine 206 may apply the trained and configured CNN to the coefficient data 203, causing the trained and configured CNN to ingest elements of the coefficient data 203 and generate the elements of displacement map data 207. As described herein, the ingested elements of coefficient data 203 may include, for each of a plurality of color channels, image pixel values (as defined by image data 201), UV position data 297, and UV texture data 299. Further, the displacement map data 207 may include, for example, values characterizing differences between pixel values of the image data 201 and pixel values identified by the UV position data 297 and UV texture data 299. For instance, the value of the displacement map at each of a plurality of coordinates may represent a residual vertex.

Moreover, aligned mesh generation engine 208 may receive displacement map data 207 from displacement map generation engine 206, as well as 3D mesh data 205 from 3D mesh reconstruction engine 204, and may generate aligned mesh data 209 characterizing an aligned mesh of the captured image based on the displacement map data 207 and the 3D mesh data 205. For instance, aligned mesh generation engine 208 may combine (e.g., add) each residual vertex of the displacement map with a corresponding vertex of the 3D mesh at each vertex index. There is a corresponding location in the displacement map for each vertex index of the 3D mesh.

For example, aligned mesh generation engine 208 may obtain aligned mesh generation model data 132D from instruction memory 132, and may execute instructions associated with aligned mesh generation model data 132D to apply an aligned mesh generation model to the displacement map data 207 and the 3D mesh data 205, causing the aligned mesh generation model to ingest elements of the displacement map data 207 and the 3D mesh data 205, and to generate the elements of aligned mesh data 209.

Figure 2B:
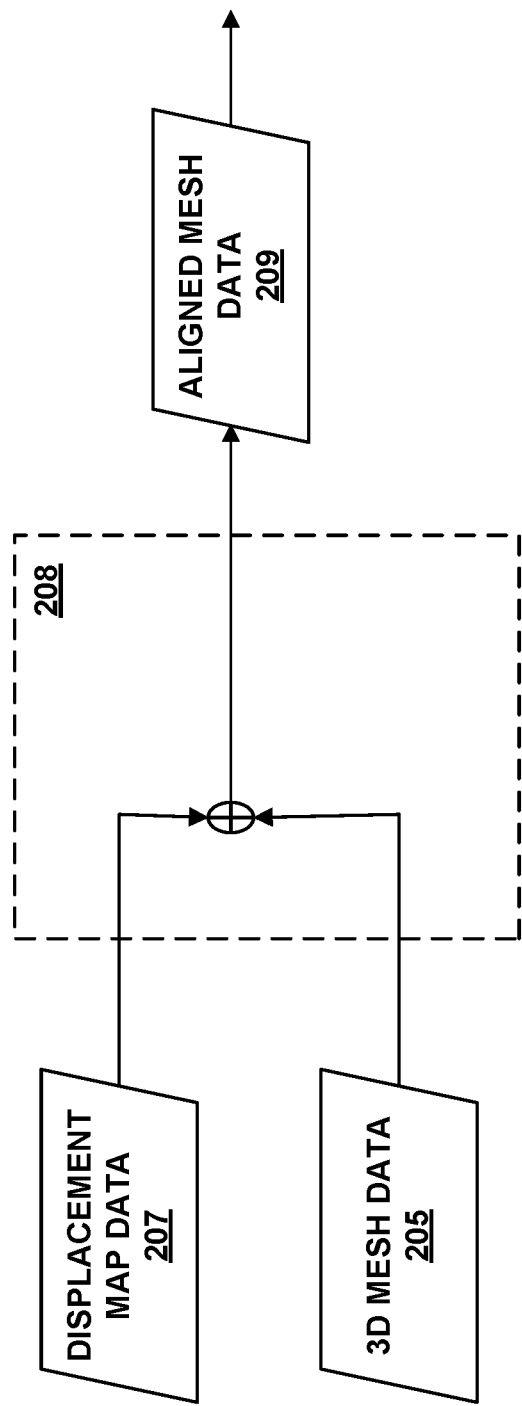

For instance, and with reference to FIG. 2B, aligned mesh generation engine 208 may sample values from the displacement map data 207, and combine the sampled values with corresponding values identified by the 3D mesh data 205 (e.g., corresponding to a same coordinate position) to generate the values of aligned mesh data 209. Thus, for instance, aligned mesh generation engine 208 may sample displacement map data 207 to obtain a displacement value for a coordinate position (e.g., U=128, V=128). Further, aligned mesh generation engine 208 may add the displacement value to a mesh value of the 3D mesh data 205 for the same coordinate position, and generate an aligned value for the coordinate position of aligned mesh data 209 based on the result of the addition.

In some examples, applying the aligned mesh generation model includes applying a predetermined weight to one or more of each mesh value of the 3D mesh data 205 and corresponding displacement value of the displacement map data 207. For instance, the aligned mesh generation model may apply a first weight map to the 3D mesh data 205 (e.g., multiply each mesh value with its corresponding weight value), and apply the second weight map to the displacement map data 207 (e.g., multiply each displacement value with its corresponding weight value), each based on pixel position (e.g., X, Y pixel coordinate). Further, the aligned mesh generation model may combine each weighted mesh value with its corresponding weighted displacement value to generate each corresponding output value of the aligned mesh.

Referring back to FIG. 2A, aligned mesh generation engine 208 may store the aligned mesh data 209 in memory, such as in system memory 131.

Figure 3:
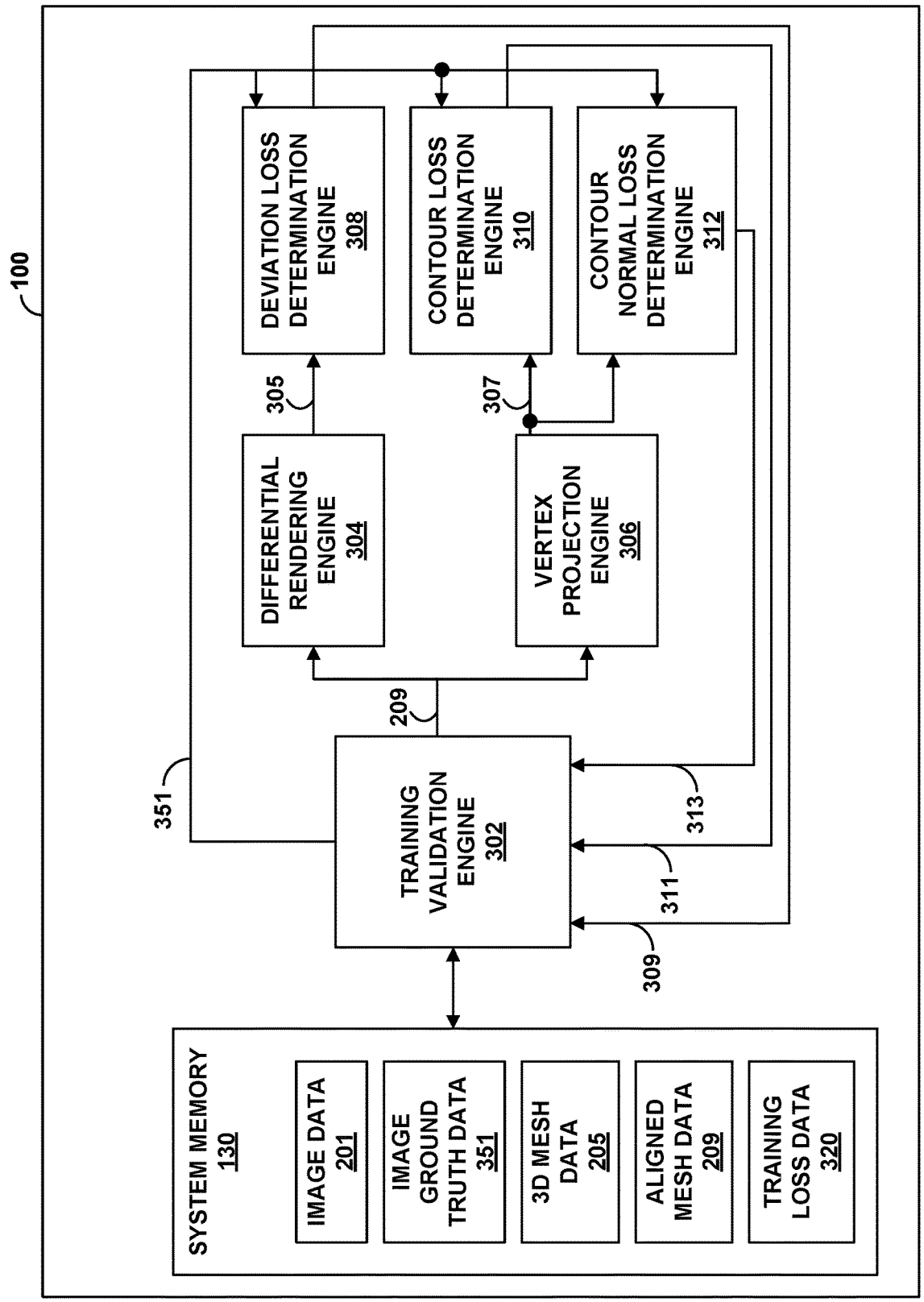

FIG. 3 illustrates a block diagram of exemplary portions of the image capture device 100 of FIG. 1 that may be employed during training of the machine learning processes, such as the CNN described herein. In this example, image capture device 100 includes a training validation engine 302, a differential rendering engine 304, a vertex projection engine 306, a deviation loss determination engine 308, a contour loss determination engine 310, and a contour normal loss determination engine 312. In some examples, one or more of training validation engine 302, differential rendering engine 304, vertex projection engine 306, deviation loss determination engine 308, contour loss determination engine 310, and contour normal loss determination engine 312 may be implemented in hardware. In other examples, one or more of training validation engine 302, differential rendering engine 304, vertex projection engine 306, deviation loss determination engine 308, contour loss determination engine 310, and contour normal loss determination engine 312 may be implemented as executable instructions stored within instruction memory 132 that can be executed by, for example, one or more of CPU 116 and GPU 118.

Training validation engine 302 may determine, based on one or more computed losses, when the CNN is sufficiently trained. For example, training validation engine 302 may obtain, from system memory 130, 3D mesh data 205 and corresponding aligned mesh data 209. For example, image data 201 may characterize a plurality of training images. Image capture device 100 may train the untrained CNN based on a plurality of training images. For instance, image capture device 100 may generate, for each of the plurality of training images, 3D mesh data 205 and aligned mesh data 209 as described with respect to FIGS. 2A and 2B while applying the untrained CNN.

Further, training validation engine 302 may determine a fidelity loss between the 3D mesh data 205 and aligned mesh data 209. The fidelity loss may characterize errors between the 3D mesh data 205 and aligned mesh data 209. In some examples, training validation engine 302 apply one or more constraints in determining the fidelity loss. For instance, training validation engine 302 may apply a rigidity constraint, such that differences in the shape of objects are penalized in determining the fidelity loss.

Further, training validation engine 302 may provide aligned mesh data 209 to each of differential rendering engine 304 and vertex projection engine 306. Differential rendering engine 304 may apply a differential rendering process to the aligned mesh data 209 to generate predicted mask data 305. For instance, differential rendering engine 304 may apply a differential renderer, such as OpenDR, to the aligned mesh data 209 to generate the predicted mask data 305. The predicted mask data 305 may characterize a predicted mask in rendered image space. In some examples, before rendered by the differentiable renderer, differential rendering engine 304 rotates and translates the aligned mesh data 209 into camera space. In some examples, the aligned mesh data 209 is rotated and translated into camera space based on a pose characterized by ground truth data 351 (e.g., a pose generated by 3D fitting engine 202 based on image data 201).

Further, deviation loss determination engine 308 may determine an error loss 309, such as an F1 loss or an F2 loss, between the predicted mask data 305 and corresponding ground truth data 351. Corresponding ground truth data 351 may include, for example, ground truth masks that were rendered from corresponding ground truth images characterized by image data 201. Deviation loss determination engine 308 provides the error loss 309 to training validation engine 302.

Vertex projection engine 306 generates vertex projection data 307 based on aligned mesh data 209. The vertex projection data 307 characterizes a plurality of vertices. For instance, aligned mesh data 209 may be generated in canonical space. Prior to generating the vertex projection data 307, vertex projection engine 306 may rotate and translate the aligned mesh into camera space. Once in camera space, vertex projection engine 306 may generate the vertex projection data 307 based on the aligned mesh data 209 in camera space (e.g., based on based on a full perspective, according a viewport (e.g., image size), and focal length of the image, and the aligned mesh in camera-space).

Contour loss determination engine 310 may receive the vertex projection data 307 from vertex projection engine 306, as well as image ground truth data 351 from training validation engine 312. Based on the vertex projection data 307 and the image ground truth data 351, contour loss determination engine 310 determines a contour loss 311. The contour loss 311 may characterize errors between vertices of the vertex projection data 307 and contour points characterized by the image ground truth data 351. Contour loss determination engine 310 provides the contour loss 311 to training validation engine 302.

Contour normal loss determination engine 312 may also receive the vertex projection data 307 from vertex projection engine 306, as well as image ground truth data 351 from training validation engine 312. Contour normal loss determination engine 312 determines a contour normal loss 313. The contour normal loss 313 may characterize errors between vertices of the vertex projection data 307 and contour points characterized by the image ground truth data 351, but in a direction normal to that determined for contour loss 311. For instance, while contour loss determination engine 310 determines contour loss 311 in a first direction across image ground truth data 351, contour normal loss determination engine 312 determines contour normal loss 313 in a second direction across image ground truth data 351 that is normal to the first direction. Contour normal loss determination engine 312 provides the contour normal loss 313 to training validation engine 302.

Training validation engine 302 generates training loss data 320 characterizing the computed losses (e.g., the fidelity loss, error loss 309, contour loss 311, and contour normal loss 313), and stores training loss data 320 within system memory 130.

Based on the fidelity loss, error loss 309, contour loss 311, and contour normal loss 313, training validation engine 302 may determine whether the CNN is trained sufficiently for application to captured image data. For instance, training validation engine 302 may perform operations to minimize a loss function (e.g., regression loss function) based on one or more of the fidelity loss, error loss 309, contour loss 311, and contour normal loss 313. Image capture device 100 may continue to train the untrained CNN based on additional training images until the loss function is minimized.

For instance, training validation engine 302 may determine whether one or more of the computed losses satisfy a corresponding threshold to determine whether the in-training CNN has converged. Training validation engine 302 may compare each computed loss to its corresponding threshold to determine if each computed loss meets or exceeds its corresponding threshold. In some examples, when each of the computed losses meet or exceed their corresponding thresholds, training validation engine 302 determines the in-training CNN has converged, and training is complete.

In some examples, after determining the CNN is trained, image capture device 100 generates additional 3D mesh data 205 and additional aligned mesh data 209 based on additional image data 301 characterizing a validation data set while applying the initially trained CNN. Further, and based on the additional 3D mesh data 205 and additional aligned mesh data 209, training validation engine 302 determines fidelity losses. In addition, and as described herein, each of deviation loss determination engine 308, contour loss determination engine 310, and contour normal loss determination engine 312 determine error losses 309, contour losses 311, and contour normal losses 313, respectively. Training validation engine 302 determines whether the initially trained CNN is sufficiently trained based on the fidelity losses, error losses 309, contour losses 311, and contour normal losses 313. If the computed losses indicate that the initially trained CNN is not sufficiently trained (e.g., the one or more computed losses do not meet their corresponding thresholds), image capture device 100 continues to train the CNN (e.g., with additional training images).

Although, as described, image capture device 100 trains the CNN, one or more of any suitable processing devices associated with image capture device 100 may train the CNN as described herein. For example, one or more servers, such as one or more cloud-based servers, may train the CNN. In some examples, one or more processors (e.g., CPUs, GPUs) of a distributed or cloud-based computing cluster may train the CNN. In some implementations, the CNN is trained by another processing device associated with image capture device 100, and the other processing device stores the configuration parameters, hyperparameters, and/or weights associated with the trained CNN in a data repository over a network (e.g., the Internet). Further, image capture device 100 obtains, over the network, the stored configuration parameters, hyperparameters, and/or weights, and stores them within instruction memory 132 (e.g., within anti-spoofing model data 132A). Image capture device 100 may then establish CNN 200 based on the configuration parameters, hyperparameters, and/or weights stored within instruction memory 132 (e.g., displacement map generation model data 132C).

Figure 4:
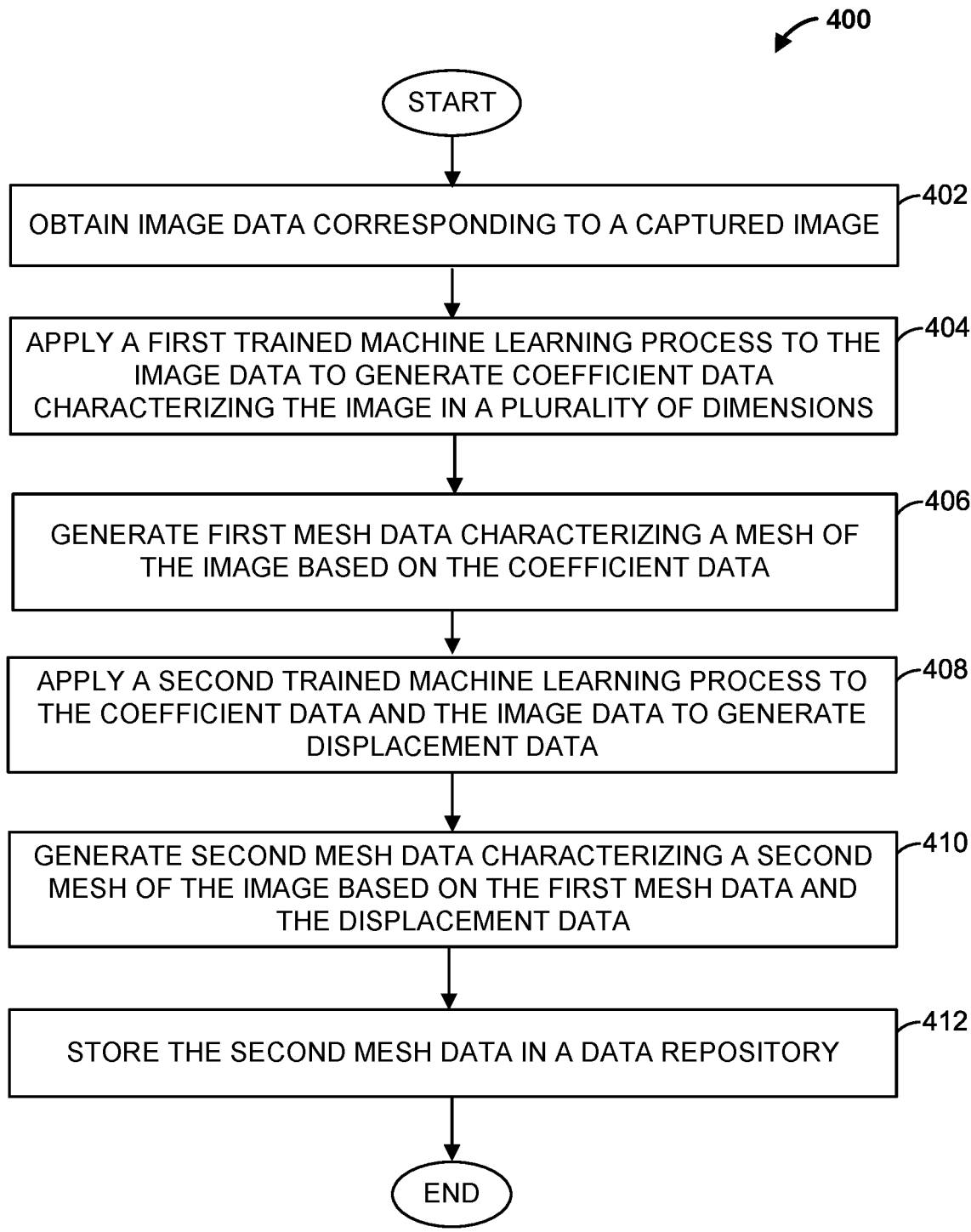
FIG. 4 is a flowchart of an exemplary process for applying trained machine learning processes to image data to reconstruct an image, according to some implementations.

FIG. 4 is a flowchart of an example process 400 for applying trained machine learning processes to image data to reconstruct an image, such as a 3D image. Process 400 may be performed by one or more processors executing instructions locally at a computing device, such as by one or more of camera processor 114, CPU 116, and GPU 118 of image capture device 100 of FIG. 1. Accordingly, the various operations of process 400 may be represented by executable instructions held in storage media of one or more computing platforms, such as instruction memory 132 of image capture device 100.

At block 402, image capture device 100 obtains image data corresponding to a captured image. For example, the image capture device 100 may capture an image of a user, such as a user taking a "selfie." At step 404, the image capture device 100 applies a first trained machine learning process to the image data to generate coefficient data characterizing the image in a plurality of dimensions. For example, image capture device 100 may obtain, from instruction memory 132, 3D reconstruction 132A characterizing configuration parameters, hyperparameters, and/or weights for a trained 3D fitting model, and may configure a 3D fitting model based on the obtained configuration parameters, hyperparameters, and/or weights. Further, image capture device 100 applies the configured 3D fitting model to the image data causing the configured 3D fitting model to ingest elements of the image data and, based on the ingested elements, output coefficient data characterizing, for each of a plurality of color channels (e.g., red, green, and blue channels), one or more of image pixel values, a plurality of vertices, texture values and coordinates (e.g., UV texture values and UV texture coordinates), object rotation angles (e.g., pitch, yaw, and roll), and focal lengths.

Further, and at step 406, the image capture device 100 generates, based on the coefficient data, first mesh data characterizing a mesh of the image. For example, image capture device 100 may obtain, from instruction memory 132, 3D mesh reconstruction model data 132B, and may execute 3D mesh reconstruction model data 132B to reconstruct a mesh based on the coefficient data. For instance, image capture device 100 may generate the first mesh data based on a plurality of texture coordinates and texture values defined within the coefficient data.

At step 408, the image capture device 100 applies a second trained machine learning process to the coefficient data and the image data to generate displacement data. For example, image capture device 100 may obtain, from instruction memory 132, displacement map generation model data 132C characterizing configuration parameters, hyperparameters, and/or weights for a trained map generation model, such as the CNN described herein, and may configure a map generation model based on the obtained configuration parameters, hyperparameters, and/or weights. Further, image capture device 100 executes the configured map generation model to ingest elements of the coefficient data and the captured image to generate a displacement map characterizing, for instance, a plurality of displacement values.

Proceeding to step 410, the image capture device generates second mesh data characterizing a second mesh of the image based on the first mesh data and the displacement data. For example, image capture device 100 may obtain, from instruction memory 132, aligned mesh generation model data 132D, and may execute instructions associated with aligned mesh generation model data 132D to reconstruct an aligned mesh based on the first mesh data and the displacement data. For instance, image capture device 100 may execute the instructions to sample the displacement map to obtain displacement values, and may add the displacement values to corresponding mesh values defined by the first mesh data to generate the second mesh data.

Further, at step 412, the image capture device 100 may store the second mesh data in a data repository. For example, the image capture device 100 may store the second mesh data within system memory 130. In some examples, image capture device 100 provides the second mesh data for display. In some examples, image capture device 100 transmits the second mesh data to another computing device, causing the receiving computer device to display the second mesh data.

Figure 5:
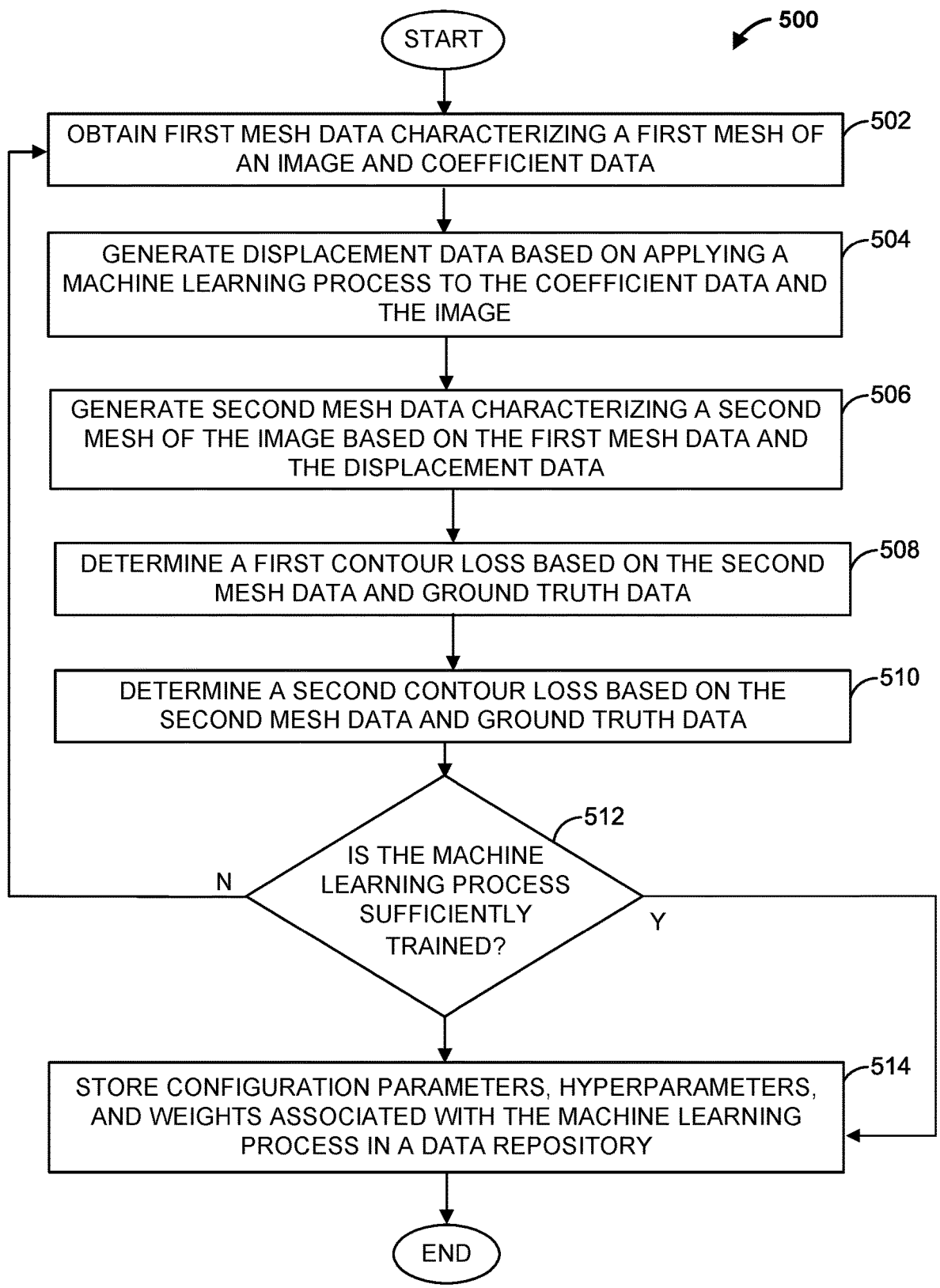
FIG. 5 is a flowchart of an exemplary process for training a machine learning process, according to some implementations.

FIG. 5 is a flowchart of an example process 500 for training a machine learning process, in accordance with one implementation. Process 500 may be performed by one or more processors executing instructions locally at a computing device, such as by one or more of camera processor 114, CPU 116, and GPU 118 of image capture device 100 of FIG. 1. Accordingly, the various operations of process 800 may be represented by executable instructions held in storage media of one or more computing platforms, such as instruction memory 132 of image capture device 100.

At block 502, the image capture device 100 obtains first mesh data characterizing a first mesh of an image. The image capture device 100 also obtains coefficient data characterizing the image in a plurality of dimensions. For instance, image capture device 100 may have generated coefficient data, such as coefficient data 203, for each of a plurality of training images based on applying the 3D reconstruction model described herein to the plurality of training images. Further, and based on the coefficient data, the image capture device 100 may generated 3D mesh data, such as 3D mesh data 205, as described herein. Image capture device 100 may store the coefficient data and the first mesh data within a data repository, such as system memory 131. Image capture device 100 may obtain the stored coefficient data and the first mesh data from the data repository for training, for example, an untrained CNN.

Further, at step 504, the image capture device 100 generates displacement data based on applying a machine learning process to the coefficient data and the image. For example, the image capture device 100 may execute a map generation model, such as the untrained CNN described herein, to ingest elements of the coefficient data and the captured image to generate a displacement map characterizing, for instance, a plurality of displacement values.

At block 506, the image capture device 100 generates second mesh data characterizing a second mesh of the image based on the first mesh data and the displacement data. For instance, the image capture device 100 may execute the aligned mesh generation model described herein to ingest elements of the displacement map and the first mesh data, and to generate elements of the second mesh data, such as elements of aligned mesh data 209.

Proceeding to step 508, the image capture device 100 may determine a first contour loss based on the second mesh data and corresponding ground truth data. For example, the image capture device may generate vertex projection data, such as may be generated by vertex projection engine 306, based on the second mesh data. Further, and based on the vertex projection data and the ground truth data (e.g., which may include rendered mask data generated by applying the differential rendering process described herein to the second mesh data), the image capture device may determine a contour loss, such as contour loss 311.

At step 510, the image capture device 100 may determine a second contour loss based on the second mesh data and the corresponding ground truth data. For example, based on the vertex projection data and the ground truth data, the image capture device may determine a contour normal loss, such as contour normal loss 313. As described herein, the first loss may characterize errors between vertices of the second mesh data and the vertex projection data in a first direction, and the second loss may characterize errors between vertices of the second mesh data and the vertex projection data in a second direction. The second direction may be normal to the first direction.

Further, at step 512, the image capture device determines whether the machine learning process, such as the untrained CNN, is sufficiently trained based on the first and second contour losses. For example, the image capture device 100 may compare the each of the first and second contour losses to a predetermined threshold. If any of the first and second contour losses is at or beyond its corresponding threshold, the image capture device 100 determines that the machine learning process is not sufficiently trained and the method proceeds back to step 502, where additional mesh data is obtained for further training operations. If, however, the computed losses are not at or beyond their corresponding thresholds, the image capture device 100 determines that the machine learning process is sufficiently trained and the method proceeds to step 514.

At step 514, the image capture device 100 stores one or more of configuration parameters, hyperparameters, and weights learned during the training in a data repository. For example, the image capture device 100 may store the one or more of configuration parameters, hyperparameters, and weights within displacement map generation model data 132C of instruction memory 132.

Implementation examples are further described in the following numbered clauses:

1. An apparatus comprising:
   a non-transitory, machine-readable storage medium storing instructions; and
   at least one processor coupled to the non-transitory, machine-readable storage medium, the at least one processor being configured to:
   apply a first trained machine learning process to an image and generate coefficient data characterizing the image in a plurality of dimensions based on the application of the first trained machine learning process to the image;
   generate first mesh data characterizing a first mesh of the image based on the coefficient data;
   apply a second trained machine learning process to the coefficient data and the image, and generate displacement data characterizing a displacement image based on the application of the second trained machine learning process to the coefficient data and the image; and
   generate second mesh data characterizing a second mesh of the image based on the first mesh data and the displacement data.

2. The apparatus of clause 1, wherein applying the second trained machine learning process comprises establishing a convolutional neural network.

3. The apparatus of any of clauses 1-2, wherein the at least one processor is configured to train the second trained machine learning process based on a plurality of training images and corresponding texture values.

4. The apparatus of clause 3, wherein the at least one processor is configured:
   generate third mesh data characterizing a mesh of each of the plurality of training images;
   generate additional displacement data characterizing a displacement image for each of the plurality of training images;

generate fourth mesh data characterizing an additional mesh of each of the plurality of training images based on the third mesh data and the additional displacement data;

determine a first loss based on the third mesh data and the fourth mesh data; and determine whether training of the second trained machine learning process is complete based on the first loss.

5. The apparatus of clause 4, wherein the at least one processor is configured:

apply a differential renderer to the fourth mesh data to generate predicted mask data; and determine a loss based on the predicted mask data and corresponding ground truth data.

6. The apparatus of any of clauses 4-5, wherein the at least one processor is configured:

generate vertex projection data based on the fourth mesh data;

determine a contour loss based on the vertex projection data and corresponding ground truth data, wherein the contour loss characterizes errors between vertices of the vertex projection data and the corresponding ground truth data in a first direction;

determine a contour normal loss based on the vertex projection data and the corresponding ground truth data, wherein the contour normal loss characterizes additional errors between the vertices of the vertex projection data and the corresponding ground truth data in a second direction; and determine whether training of the second trained machine learning process is complete based on the contour loss and the contour normal loss.

7. The apparatus of clause 6, wherein the first direction is normal to the second direction.

8. The apparatus of any of clauses 1-7, wherein the coefficient data comprises a plurality of texture values, each of the plurality of texture values corresponding to a texture coordinate.

9. The apparatus of clause 8, wherein the second trained machine learning process is applied to the plurality of texture values.

10. The apparatus of any of clauses 1-9, wherein the at least one processor is further configured to execute the instructions to:

sample the displacement data to obtain a displacement value; and add the displacement value to a corresponding mesh value of the second mesh.

11. The apparatus of any of clauses 1-10 comprising a camera configured to capture the image.

12. The apparatus of any of clauses 1-11 comprising a display configured to display the second mesh data.

13. The apparatus of any of clauses 1-12, wherein the at least one processor is further configured to execute the instructions to render a 3 dimensional model based on the second mesh data.

14. The apparatus of clause 13, wherein the 3 dimensional model includes a face.

15. The apparatus of any of clauses 1-14, wherein the at least one processor is further configured to execute the instructions to output the second mesh data.

16. The apparatus of any of clauses 1-15, wherein the at least one processor is further configured to execute the instructions to:

receive a second image;

apply the first trained machine learning process to the second image and generate second coefficient data characterizing the second image in the plurality of dimensions based on the application of the first trained machine learning process to the second image;

generate third mesh data characterizing a first mesh of the second image based on the second coefficient data;

apply the second trained machine learning process to the second coefficient data and the second image, and generate second displacement data characterizing a second displacement image based on the application of the second trained machine learning process to the second coefficient data and the second image; and generate fourth mesh data characterizing a second mesh of the second image based on the third mesh data and the second displacement data.

17. The apparatus of clause 16, wherein the at least one processor is further configured to execute the instructions to output the second mesh data and the fourth mesh data.

18. The apparatus of any of clauses 1-17, wherein the at least one processor is further configured to execute the instructions to:

receive a first input from a user; and capture the image in response to the first input from the user.

19. The apparatus of any of clauses 1-18, wherein the at least one processor is further configured to execute the instruction to:

receive an input from the user;

determine a region of interest of the image based on the input from the user;

perform one or more of automatic focus, automatic exposure, automatic gain, and automatic white balance based on the region of interest; and capture the image based on the performance of the one or more of automatic focus, automatic exposure, automatic gain, and automatic white balance.

20. A method comprising:

applying a first trained machine learning process to an image and generate coefficient data characterizing the image in a plurality of dimensions based on the application of the first trained machine learning process to the image;

generating first mesh data characterizing a first mesh of the image based on the coefficient data;

applying a second trained machine learning process to the coefficient data and the image and generate displacement data characterizing a displacement image based on the application of the second trained machine learning process to the coefficient data and the image; and generating second mesh data characterizing a second mesh of the image based on the first mesh data and the displacement data.

21. The method of clause 20, wherein applying the second trained machine learning process comprises establishing a convolutional neural network.

22. The method of any of clauses 20-21, wherein the method comprises training the second trained machine learning process based on a plurality of training images and corresponding texture values.

23. The method of clause 22, further comprising:

generating third mesh data characterizing a mesh of each of the plurality of training images;

generating additional displacement data characterizing a displacement image for each of the plurality of training images;

generating fourth mesh data characterizing an additional mesh of each of the plurality of training images based on the third mesh data and the additional displacement data;
determining a first loss based on the third mesh data and the fourth mesh data; and
determining whether training of the second trained machine learning process is complete based on the first loss.

24. The method of clause 23, further comprising:
applying a differential renderer to the fourth mesh data to generate predicted mask data; and determining a loss based on the predicted mask data and corresponding ground truth data.

25. The method of any of clauses 23-24, further comprising:
generating vertex projection data based on the fourth mesh data;
determining a contour loss based on the vertex projection data and corresponding ground truth data, wherein the contour loss characterizes errors between vertices of the vertex projection data and the corresponding ground truth data in a first direction;
determining a contour normal loss based on the vertex projection data and the corresponding ground truth data, wherein the contour normal loss characterizes additional errors between the vertices of the vertex projection data and the corresponding ground truth data in a second direction; and
determining whether training of the second trained machine learning process is complete based on the contour loss and the contour normal loss.

26. The method of clause 25, wherein the first direction is normal to the second direction.

27. The method of any of clauses 20-26, wherein the coefficient data comprises a plurality of texture values, each of the plurality of texture values corresponding to a texture coordinate.

28. The method of clause 27, wherein the second trained machine learning process is applied to the plurality of texture values.

29. The method of any of clauses 20-28, further comprising:
sampling the displacement data to obtain a displacement value; and
adding the displacement value to a corresponding mesh value of the second mesh.

30. The method of any of clauses 20-29, further comprising capturing the image with a camera.

31. The method of any of clauses 20-30, further comprising displaying the second mesh data.

32. The method of any of clauses 20-31, further comprising rendering a 3 dimensional model based on the second mesh data.

33. The method of clause 32, wherein the 3 dimensional model includes a face.

34. The method of any of clauses 20-33, further comprising outputting the second mesh data.

35. The method of any of clauses 20-34, further comprising:
receiving a second image;
applying the first trained machine learning process to the second image and generate second coefficient data characterizing the second image in the plurality of dimensions based on the application of the first trained machine learning process to the second image;
generating third mesh data characterizing a first mesh of the second image based on the second coefficient data;
applying the second trained machine learning process to the second coefficient data and the second image, and generate second displacement data characterizing a second displacement image based on the application of the second trained machine learning process to the second coefficient data and the second image; and
generating fourth mesh data characterizing a second mesh of the second image based on the third mesh data and the second displacement data.

36. The method of clause 35, further comprising outputting the second mesh data and the fourth mesh data.

37. The method of any of clauses 20-36, further comprising:
receiving a first input from a user; and capturing the image in response to the first input from the user.

38. The method of any of clauses 20-37, further comprising:
receiving an input from the user;
determining a region of interest of the image based on the input from the user;
performing one or more of automatic focus, automatic exposure, automatic gain, and automatic white balance based on the region of interest; and
capturing the image based on the performance of the one or more of automatic focus, automatic exposure, automatic gain, and automatic white balance.

39. A non-transitory, machine-readable storage medium storing instructions that, when executed by at least one processor, causes the at least one processor to perform operations that include:
applying a first trained machine learning process to an image and generate coefficient data characterizing the image in a plurality of dimensions based on the application of the first trained machine learning process to the image;
generating first mesh data characterizing a first mesh of the image based on the coefficient data;
applying a second trained machine learning process to the coefficient data and the image and generate displacement data characterizing a displacement image based on the application of the second trained machine learning process to the coefficient data and the image; and
generating second mesh data characterizing a second mesh of the image based on the first mesh data and the displacement data.

40. The non-transitory, machine-readable storage medium of clause 39, wherein applying the second trained machine learning process comprises establishing a convolutional neural network.

41. The non-transitory, machine-readable storage medium of any of clauses 39-40, wherein the operations comprise training the second trained machine learning process based on a plurality of training images and corresponding texture values.

42. The non-transitory, machine-readable storage medium of clause 41, wherein the operations comprise:
generating third mesh data characterizing a mesh of each of the plurality of training images;
generating additional displacement data characterizing a displacement image for each of the plurality of training images;
generating fourth mesh data characterizing an additional mesh of each of the plurality of training images based on the third mesh data and the additional displacement data;

determining a first loss based on the third mesh data and the fourth mesh data; and determining whether training of the second trained machine learning process is complete based on the first loss.

43. The non-transitory, machine-readable storage medium of clause 42, wherein the operations comprise:

applying a differential renderer to the fourth mesh data to generate predicted mask data; and determining a loss based on the predicted mask data and corresponding ground truth data.

44. The non-transitory, machine-readable storage medium of any of clauses 42-43, wherein the operations comprise:

generating vertex projection data based on the fourth mesh data;

determining a contour loss based on the vertex projection data and corresponding ground truth data, wherein the contour loss characterizes errors between vertices of the vertex projection data and the corresponding ground truth data in a first direction;

determining a contour normal loss based on the vertex projection data and the corresponding ground truth data, wherein the contour normal loss characterizes additional errors between the vertices of the vertex projection data and the corresponding ground truth data in a second direction; and determining whether training of the second trained machine learning process is complete based on the contour loss and the contour normal loss.

45. The non-transitory, machine-readable storage medium of clause 44, wherein the first direction is normal to the second direction.

46. The non-transitory, machine-readable storage medium of any of clauses 39-45, wherein the coefficient data comprises a plurality of texture values, each of the plurality of texture values corresponding to a texture coordinate.

47. The non-transitory, machine-readable storage medium of clause 46, wherein the second trained machine learning process is applied to the plurality of texture values.

48. The non-transitory, machine-readable storage medium of any of clauses 39-47, wherein the operations comprise:

sampling the displacement data to obtain a displacement value; and adding the displacement value to a corresponding mesh value of the second mesh.

49. The non-transitory, machine-readable storage medium of any of clauses 39-48, wherein the operations comprise capturing the image with a camera.

50. The non-transitory, machine-readable storage medium of any of clauses 39-49, wherein the operations comprise displaying the second mesh data.

51. The non-transitory, machine-readable storage medium of any of clauses 39-50, wherein the operations comprise rendering a 3 dimensional model based on the second mesh data.

52. The non-transitory, machine-readable storage medium of clause 51, wherein the 3 dimensional model includes a face.

53. The non-transitory, machine-readable storage medium of any of clauses 39-52, wherein the operations comprise outputting the second mesh data.

54. The non-transitory, machine-readable storage medium of any of clauses 39-53, wherein the operations comprise:

receiving a second image;

applying the first trained machine learning process to the second image and generate second coefficient data characterizing the second image in the plurality of dimensions based on the application of the first trained machine learning process to the second image;

generating third mesh data characterizing a first mesh of the second image based on the second coefficient data;

applying the second trained machine learning process to the second coefficient data and the second image, and generate second displacement data characterizing a second displacement image based on the application of the second trained machine learning process to the second coefficient data and the second image; and generating fourth mesh data characterizing a second mesh of the second image based on the third mesh data and the second displacement data.

55. The non-transitory, machine-readable storage medium of clause 54, wherein the operations comprise outputting the second mesh data and the fourth mesh data.

56. The non-transitory, machine-readable storage medium of any of clauses 39-55, wherein the operations comprise:

receiving a first input from a user; and capturing the image in response to the first input from the user.

57. The non-transitory, machine-readable storage medium of any of clauses 39-57, wherein the operations comprise:

receiving an input from the user;

determining a region of interest of the image based on the input from the user;

performing one or more of automatic focus, automatic exposure, automatic gain, and automatic white balance based on the region of interest; and capturing the image based on the performance of the one or more of automatic focus, automatic exposure, automatic gain, and automatic white balance.

58. An image capture device comprising:

a means for applying a first trained machine learning process to an image and generate coefficient data characterizing the image in a plurality of dimensions based on the application of the first trained machine learning process to the image;

a means for generating first mesh data characterizing a first mesh of the image based on the coefficient data;

a means for applying a second trained machine learning process to the coefficient data and the image and generate displacement data characterizing a displacement image based on the application of the second trained machine learning process to the coefficient data and the image; and a means for generating second mesh data characterizing a second mesh of the image based on the first mesh data and the displacement data.

59. The image capture device of clause 58, wherein applying the second trained machine learning process comprises establishing a convolutional neural network.

60. The image capture device of any of clauses 58-59, comprising a means for training the second trained machine learning process based on a plurality of training images and corresponding texture values.

61. The image capture device of clause 60, comprising:

a means for generating third mesh data characterizing a mesh of each of the plurality of training images;

a means for generating additional displacement data characterizing a displacement image for each of the plurality of training images;

a means for generating fourth mesh data characterizing an additional mesh of each of the plurality of training images based on the third mesh data and the additional displacement data;

a means for determining a first loss based on the third mesh data and the fourth mesh data; and a means for determining whether training of the second trained machine learning process is complete based on the first loss.

62. The image capture device of clause 61, comprising:

a means for applying a differential renderer to the fourth mesh data to generate predicted mask data; and a means for determining a loss based on the predicted mask data and corresponding ground truth data.

63. The image capture device of any of clauses 58-62, comprising:

a means for generating vertex projection data based on the fourth mesh data;

a means for determining a contour loss based on the vertex projection data and corresponding ground truth data, wherein the contour loss characterizes errors between vertices of the vertex projection data and the corresponding ground truth data in a first direction;

a means for determining a contour normal loss based on the vertex projection data and the corresponding ground truth data, wherein the contour normal loss characterizes additional errors between the vertices of the vertex projection data and the corresponding ground truth data in a second direction; and a means for determining whether training of the second trained machine learning process is complete based on the contour loss and the contour normal loss.

64. The image capture device of clause 63, wherein the first direction is normal to the second direction.

65. The image capture device of any of clauses 58-64, wherein the coefficient data comprises a plurality of texture values, each of the plurality of texture values corresponding to a texture coordinate.

66. The image capture device of clause 65, comprising a means for applying the second trained machine learning process to the plurality of texture values.

67. The image capture device of any of clauses 58-66, comprising:

a means for sampling the displacement data to obtain a displacement value; and a means for adding the displacement value to a corresponding mesh value of the second mesh.

68. The image capture device of any of clauses 58-67 comprising a means for capturing the image with a camera.

69. The image capture device of any of clauses 58-68 comprising a means to display the second mesh data.

70. The image capture device of any of clauses 58-69, comprising a means for rendering a 3 dimensional model based on the second mesh data.

71. The image capture device of clause 71, wherein the 3 dimensional model includes a face.

72. The image capture device of any of clauses 58-71, comprising a means for outputting the second mesh data.

73. The image capture device of any of clauses 58-72, comprising:

a means for receiving a second image;

a means for applying the first trained machine learning process to the second image and generate second coefficient data characterizing the second image in the plurality of dimensions based on the application of the first trained machine learning process to the second image;

a means for generating third mesh data characterizing a first mesh of the second image based on the second coefficient data;

a means for applying the second trained machine learning process to the second coefficient data and the second image, and generate second displacement data characterizing a second displacement image based on the application of the second trained machine learning process to the second coefficient data and the second image; and a means for generating fourth mesh data characterizing a second mesh of the second image based on the third mesh data and the second displacement data.

74. The image capture device of clause 73, comprising a means for outputting the second mesh data and the fourth mesh data.

75. The image capture device of any of clauses 58-74, comprising:

a means for receiving a first input from a user; and a means for capturing the image in response to the first input from the user.

76. The image capture device of any of clauses 58-75, comprising:

a means for receiving an input from the user;

a means for determining a region of interest of the image based on the input from the user;

a means for performing one or more of automatic focus, automatic exposure, automatic gain, and automatic white balance based on the region of interest; and a means for capturing the image based on the performance of the one or more of automatic focus, automatic exposure, automatic gain, and automatic white balance.

Although the methods described above are with reference to the illustrated flowcharts, many other ways of performing the acts associated with the methods may be used. For example, the order of some operations may be changed, and some embodiments may omit one or more of the operations described and/or include additional operations.

Further, although the exemplary embodiments described herein are, at times, described with respect to an image capture device, the machine learning processes, as well as the training of those machine learning processes, may be implemented by one or more suitable devices. For example, in some examples, an image capture device may capture an image (e.g., an image that includes a person's face), and may transmit the image to a distributed or cloud computing system. The distributed or cloud computing system may apply the trained machine learning processes described herein to determine whether the image includes an unauthorized object, and may transmit data (e.g., a message) to the image capture device, or any other suitable device (e.g., a user's cellphone) identifying whether the image includes an unauthorized object.

Additionally, the methods and system described herein may be at least partially embodied in the form of computer-implemented processes and apparatus for practicing those processes. The disclosed methods may also be at least partially embodied in the form of tangible, non-transitory machine-readable storage media encoded with computer program code. For example, the methods may be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for practicing the method. The methods may also be at least partially embodied in the form of a computer into which computer program code is loaded or executed, such that, the computer becomes a special purpose computer for practicing the methods. When implemented on a general-purpose processor, computer program code segments configure the processor to create specific logic circuits. The methods may alternatively be at least partially embodied in application specific integrated circuits for performing the methods.

We claim:

1. An apparatus comprising:
a non-transitory, machine-readable storage medium storing instructions; and
at least one processor coupled to the non-transitory, machine-readable storage medium, the at least one processor being configured to:
apply a first trained machine learning process to an image and generate coefficient data characterizing the image in a plurality of dimensions based on the application of the first trained machine learning process to the image;
generate first mesh data characterizing a first mesh of the image based on the coefficient data;
apply a second trained machine learning process to the coefficient data and the image, and generate displacement data characterizing a displacement image based on the application of the second trained machine learning process to the coefficient data and the image; and
generate second mesh data characterizing a second mesh of the image based on a combination of at least one vertex of the first mesh data and at least one vertex of the displacement data corresponding to a same coordinate.

2. The apparatus of claim 1, wherein applying the second trained machine learning process comprises establishing a convolutional neural network.

3. The apparatus of claim 1, wherein the coefficient data comprises a plurality of texture values, each of the plurality of texture values corresponding to a texture coordinate.

4. The apparatus of claim 3, wherein the second trained machine learning process is applied to the plurality of texture values.

5. The apparatus of claim 1, wherein the at least one processor is further configured to execute the instructions to:
sample the displacement data to obtain a displacement value; and
add the displacement value to a corresponding mesh value of the second mesh.

6. The apparatus of claim 1 comprising a camera configured to capture the image.

7. The apparatus of claim 1 comprising a display configured to display the second mesh data.

8. The apparatus of claim 1, wherein the at least one processor is further configured to execute the instructions to render a 3 dimensional model based on the second mesh data.

9. The apparatus of claim 8, wherein the 3 dimensional model includes a face.

10. The apparatus of claim 1, wherein the at least one processor is further configured to execute the instructions to output the second mesh data.

11. The apparatus of claim 1, wherein the at least one processor is further configured to execute the instructions to:
receive a second image;
apply the first trained machine learning process to the second image and generate second coefficient data characterizing the second image in the plurality of dimensions based on the application of the first trained machine learning process to the second image;
generate third mesh data characterizing a first mesh of the second image based on the second coefficient data;
apply the second trained machine learning process to the second coefficient data and the second image, and generate second displacement data characterizing a second displacement image based on the application of the second trained machine learning process to the second coefficient data and the second image; and
generate fourth mesh data characterizing a second mesh of the second image based on the third mesh data and the second displacement data.

12. The apparatus of claim 11, wherein the at least one processor is further configured to execute the instructions to output the second mesh data and the fourth mesh data.

13. The apparatus of claim 1, wherein the at least one processor is further configured to execute the instructions to:
receive a first input from a user; and
capture the image in response to the first input from the user.

14. The apparatus of claim 13, wherein the at least one processor is further configured to execute the instruction to:
receive a second input from the user;
determine a region of interest of the image based on the second input from the user;
perform one or more of automatic focus, automatic exposure, automatic gain, and automatic white balance based on the region of interest; and
capture the image based on the performance of the one or more of automatic focus, automatic exposure, automatic gain, and automatic white balance.

15. A method comprising:
applying a first trained machine learning process to an image and generate coefficient data characterizing the image in a plurality of dimensions based on the application of the first trained machine learning process to the image;
generating first mesh data characterizing a first mesh of the image based on the coefficient data;
applying a second trained machine learning process to the coefficient data and the image and generate displacement data characterizing a displacement image based on the application of the second trained machine learning process to the coefficient data and the image; and
generating second mesh data characterizing a second mesh of the image based on a combination of at least one vertex of the first mesh data and at least one vertex of the displacement data corresponding to a same coordinate.

16. The method of claim 15, wherein applying the second trained machine learning process comprises establishing a convolutional neural network.

17. The method of claim 15, comprising:
sampling the displacement data to obtain a displacement value; and
adding the displacement value to a corresponding mesh value of the second mesh.

18. The method of claim 15, comprising:
receiving a second image;
applying the first trained machine learning process to the second image and generate second coefficient data characterizing the second image in the plurality of dimensions based on the application of the first trained machine learning process to the second image;
generating third mesh data characterizing a first mesh of the second image based on the second coefficient data;

applying the second trained machine learning process to the second coefficient data and the second image, and generate second displacement data characterizing a second displacement image based on the application of the second trained machine learning process to the second coefficient data and the second image; and generating fourth mesh data characterizing a second mesh of the second image based on the third mesh data and the second displacement data.

19. A non-transitory, machine-readable storage medium storing instructions that, when executed by at least one processor, causes the at least one processor to perform operations that include:

applying a first trained machine learning process to an image and generate coefficient data characterizing the image in a plurality of dimensions based on the application of the first trained machine learning process to the image;

generating first mesh data characterizing a first mesh of the image based on the coefficient data;

applying a second trained machine learning process to the coefficient data and the image and generate displacement data characterizing a displacement image based on the application of the second trained machine learning process to the coefficient data and the image; and generating second mesh data characterizing a second mesh of the image based on a combination of at least one vertex of the first mesh data and at least one vertex of the displacement data corresponding to a same coordinate.

20. The non-transitory, machine-readable storage medium of claim 19, wherein the instructions, when executed by the at least one processor, cause the at least one processor to perform operations that include:

sampling the displacement data to obtain a displacement value; and adding the displacement value to a corresponding mesh value of the second mesh.

* * * * *